United States Patent [19]
Hatcher

[11] 4,206,815
[45] Jun. 10, 1980

[54] TOOL BAR ARRANGEMENT

[75] Inventor: John C. Hatcher, Charlotte, N.C.

[73] Assignee: Cole Manufacturing Company, Charlotte, N.C.

[21] Appl. No.: 949,437

[22] Filed: Oct. 10, 1978

[51] Int. Cl.² .............................................. A01B 73/00
[52] U.S. Cl. ...................................... 172/311; 172/456
[58] Field of Search ...................... 172/311, 456, 662; 56/228, 385; 111/57

[56] References Cited

U.S. PATENT DOCUMENTS

| 4,042,044 | 8/1977 | Honnold | 172/311 |
| 4,126,189 | 11/1978 | Channel | 172/456 |
| 4,128,131 | 12/1978 | Bucher et al. | 172/311 |

FOREIGN PATENT DOCUMENTS 2035912  1/1972  Fed. Rep. of Germany ........... 172/311
424522  9/1974  U.S.S.R. .................................. 172/662

OTHER PUBLICATIONS

"The New Forrest City Stacker Parallel-Action Folding Tool Bar", Forrest City, Arkansas, Sep. 1978.
"New Machines That Work Wider-Fold Narrower", *Successful Farming*, Feb. 1978, pp. 24–27.

Primary Examiner—Richard T. Stouffer
Attorney, Agent, or Firm—Bell, Seltzer, Park & Gibson

[57] ABSTRACT

In apparatus for mounting agricultural implements to be propelled over the ground by a tractor or the like, a laterally extending tool bar arrangement is provided in which a tool bar mounting at least one implement is supported to extend substantially horizontally and to be movable to and from a lowered laterally extended position and a raised laterally retracted position while the tool bar is maintained substantially horizontal.

2 Claims, 8 Drawing Figures

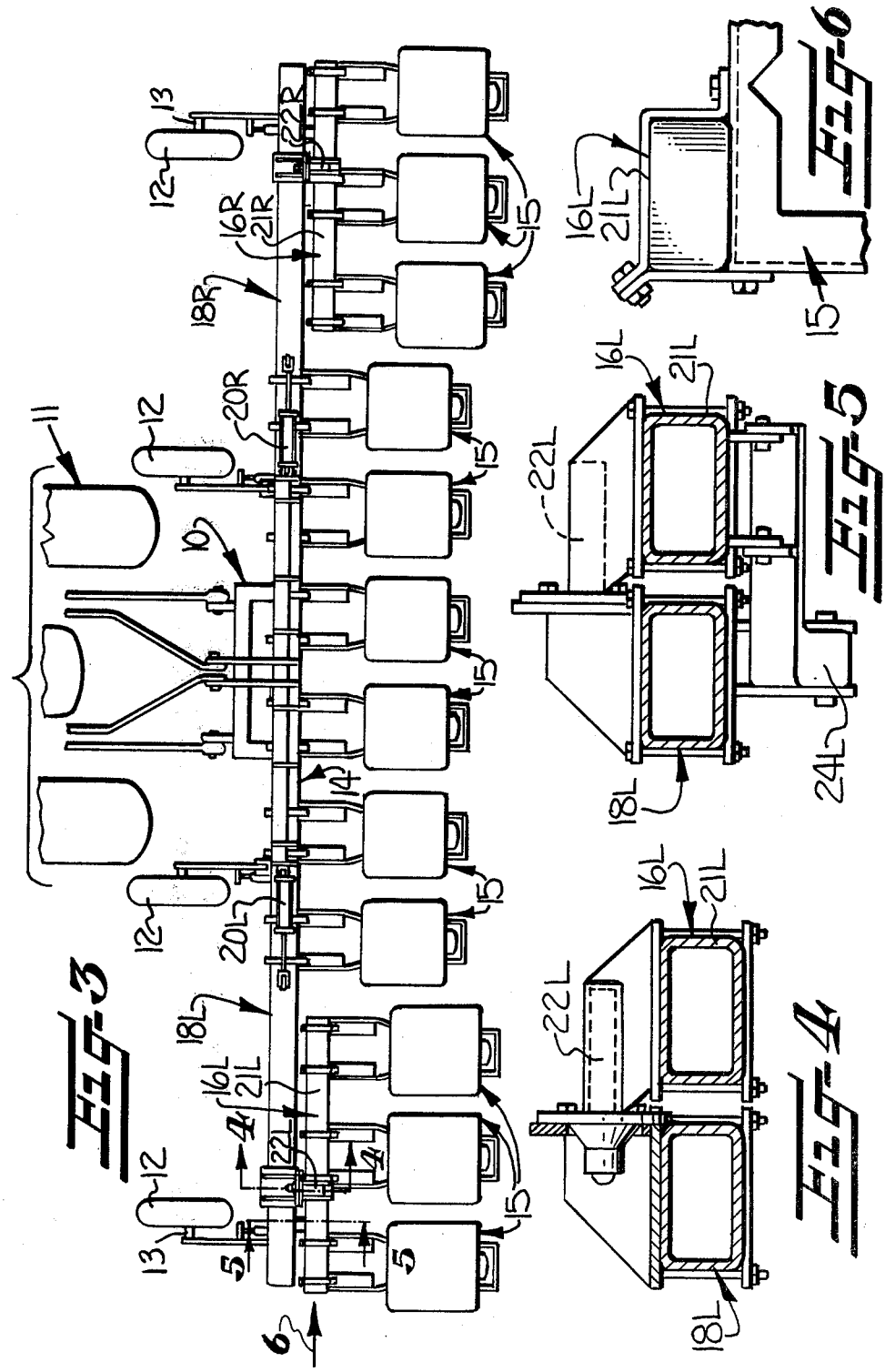

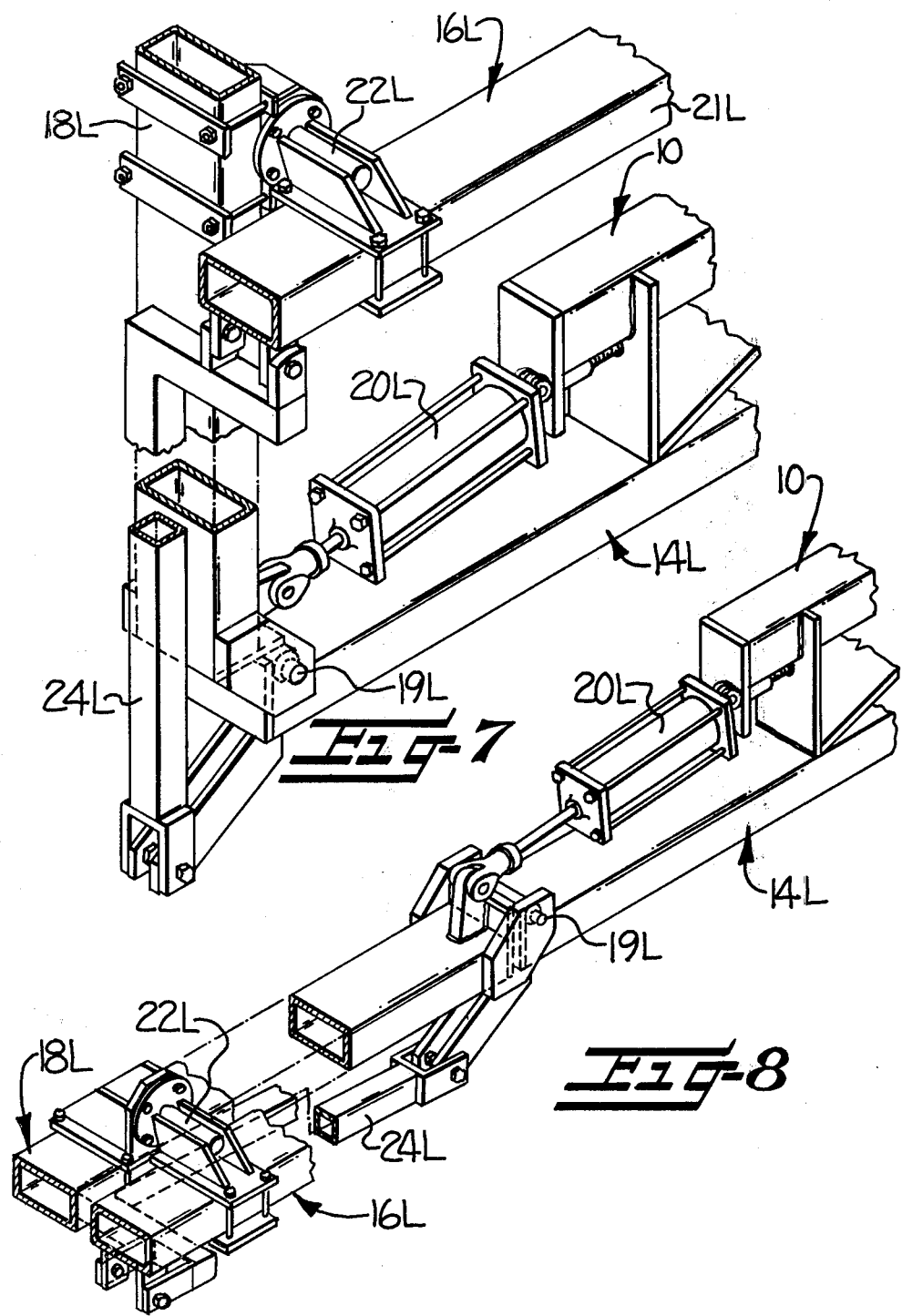

TOOL BAR ARRANGEMENT

TECHNICAL FIELD OF THE INVENTION

A wide variety of implements are employed in agriculture and are frequently drawn or propelled over the ground, such as a field being planted, by a tractor or the like. Heretofore, it has been proposed to improve the efficiency of agricultural operations by providing apparatus for mounting one or more implements for working greater areas of ground in a single traverse. Mounting arrangements for such implements have typically employed a component known as a tool bar which provides a draft or pulling connection between the implement and a pulling or propelling vehicle such as a tractor or the like.

As efforts to improve efficiencies have led to the use of increasingly powerful tractors, increasing numbers of implements have been mounted upon laterally extending tool bars in order to traverse greater areas of ground in any given pass. By way of example, where the implements mounted are row planters, the number of rows planted in a single pass across a field has been increased to as many as ten or twelve rows, depending upon the specific crop being planted. Clearly, such a relatively large number of implements has a relatively great width and may extend laterally some distance from the tractor or other propelling vehicle.

As tool bar widths have increased, difficulties have been encountered in transporting such apparatus from one field to another, due to limitations imposed by the widths of gates, roads and the like. It has therefore become necessary to provide arrangements for reducing the width occupied by such an apparatus during transport, and such reduced width has been achieved through the use of segmental tool bars arranged for movement between laterally extended and laterally retracted positions. Such arrangements, as used heretofore, have typically provided for pivotal connection between components of an elongate, laterally extending tool bar, accommodating upward folding of a portion of the tool bar.

Such upwardly folding tool bars, while achieving some use by farmers and the like, introduce serious difficulties and deficiencies, particularly relating to the movement of the folding portion of the tool bar from a horizontal position to a vertical position. More particularly, many agricultural implements include frames constructed to operate properly in a particular orientation. That is, components of the frames may be designed for dealing with vertical loads. When moved into an attitude where gravity imposes horizontal loads rather than the vertical loads for which the implement was designed, structural components of the implements may become overloaded and fail. Certain implements, most notably those provided with hoppers for dispensing materials such as seed or fertilizer, are not only subject to improper loading of structural components but to spilling of materials from hoppers and the like.

One attempted solution to spillage problems has been to mount individual implements upon some type of individual pivotal connection, relying upon gravitational forces to maintain a hopper upright and avoid spilling. Such an attempted solution does not necessarily overcome the problems mentioned hereinabove, as there is no positive attitudinal control over the implement and the hoped for pivotal motion induced by gravitational forces may not occur reliably.

BRIEF SUMMARY OF THE INVENTION

With a view to overcoming the difficiencies and difficulties encountered heretofore in the technical field of this invention, it is an object of this invention to maintain a tool bar substantially horizontal during movement of the tool bar between a lowered laterally extended position and a raised laterally retracted position. In realizing this object of the present invention, means are provided for pivotally connecting a tool bar to a frame which is adapted to be propelled over the ground by a tractor or the like and for positively maintaining the horizontal attitude of the tool bar.

Yet a further object of the present invention is to mount a plurality of agricultural implements on a tool bar arrangement which includes a main tool bar extending substantially horizontally and secondary tool bar means for supporting an additional implement to one side of the main tool bar while alternatively displacing the second implement to a position above the main tool bar so as to foreshorten the width of the apparatus for transport. In realizing this object of the present invention, the secondary tool bar is maintained substantially horizontal during movement so as to avoid any substantial change in the attitude of implements mounted thereon with respect to a vertical.

BRIEF DESCRIPTION OF DRAWINGS

Some of the objects of the invention having been stated, other objects will appear as the description proceeds, when taken in connection with the accompanying drawings, in which

FIG. 3 is a plan view of the apparatus of FIGS. 1 and 2, with the secondary tool bar means lowered to the laterally extended position;

FIG. 4 is an enlarged section view taken along the line 4—4 in FIG. 3;

FIG. 5 is a view similar to FIG. 4, taken along the line 5—5 in FIG. 3;

FIG. 6 is an enlarged view showing a portion of an implement and taken generally as indicated by the arrow 6 in FIG. 3;

FIG. 7 is an enlarged perspective view of a portion of the apparatus of FIGS. 1 through 3 showing a secondary tool bar means in a raised laterally retracted position; and FIG. 8 is a view similar to FIG. 7, showing a secondary tool bar means in lowered laterally extended position.

DETAILED DESCRIPTION OF THE INVENTION

While the present invention will be described hereinafter with particular reference to the accompanying drawings, showing an operating embodiment of the present invention, it is to be recognized at the outset of this description that it is contemplated that persons skilled in the applicable arts will be enabled by this description to modify the specific structure shown and to be described while continuing to practice this invention. Accordingly, the description which follows is to be understood as a broad, teaching disclosure directed to persons skilled in the applicable arts.

Figure 2:
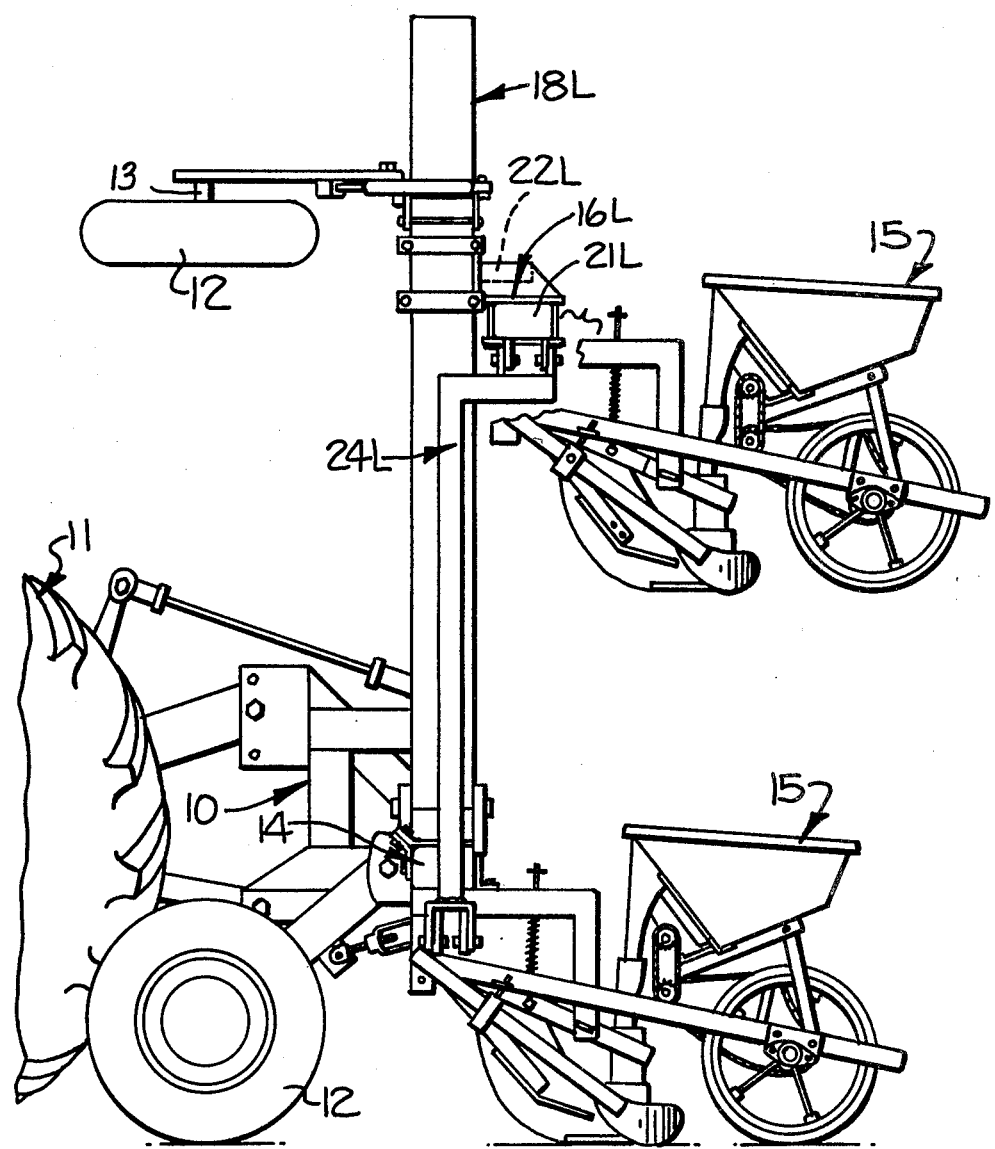
FIG. 2 is an elevation view, from the side, of the apparatus of FIG. 1, taken generally as indicated by the arrow 2 in FIG. 1.

Referring now more particularly to the accompanying drawings, an apparatus in accordance with the present invention is there shown to include a frame generally indicated at 10 which is adapted to be propelled over the ground by a tractor or the like, as indicated generally at 11 in FIGS. 2 and 3. In the form shown, the frame 10 is connected with the tractor 11 by means of a conventional and generally known three-point hitch. A plurality of ground engaging wheels 12 are provided on the apparatus to assist in bearing the weight of the apparatus during movement over the ground. Certain of the ground engaging wheels 12 are rotatably mounted on axles 13 which are in turn rigidly mounted on a lever 15 (described more fully hereinafter) for floatingly supporting an outboard tool bar (FIGS. 2 and 3).

In order to provide for mounting agricultural implements, the apparatus includes an elongate, laterally extending main tool bar 14 carried by the frame 10 and extending substantially horizontally for mounting at least one first implement thereon. In the form shown, six planters, such as are generally indicated at 15, are mounted on the main tool bar 14, for dispensing seed to be planted in a plurality of rows. The planters, as shown, are similar to those described more fully in Hatcher U.S. Pat. No. 3,841,529 issued Oct. 15, 1974 and owned in common with the present invention. To the extent that any understanding of types of agricultural implements to be mounted on the apparatus of the present invention is important to an understanding of this invention, the interested reader is directed to that prior patent. However, it is to be understood that planters of other types and other agricultural implements as well can advantageously be mounted on an apparatus in accordance with the present invention.

Figure 1:
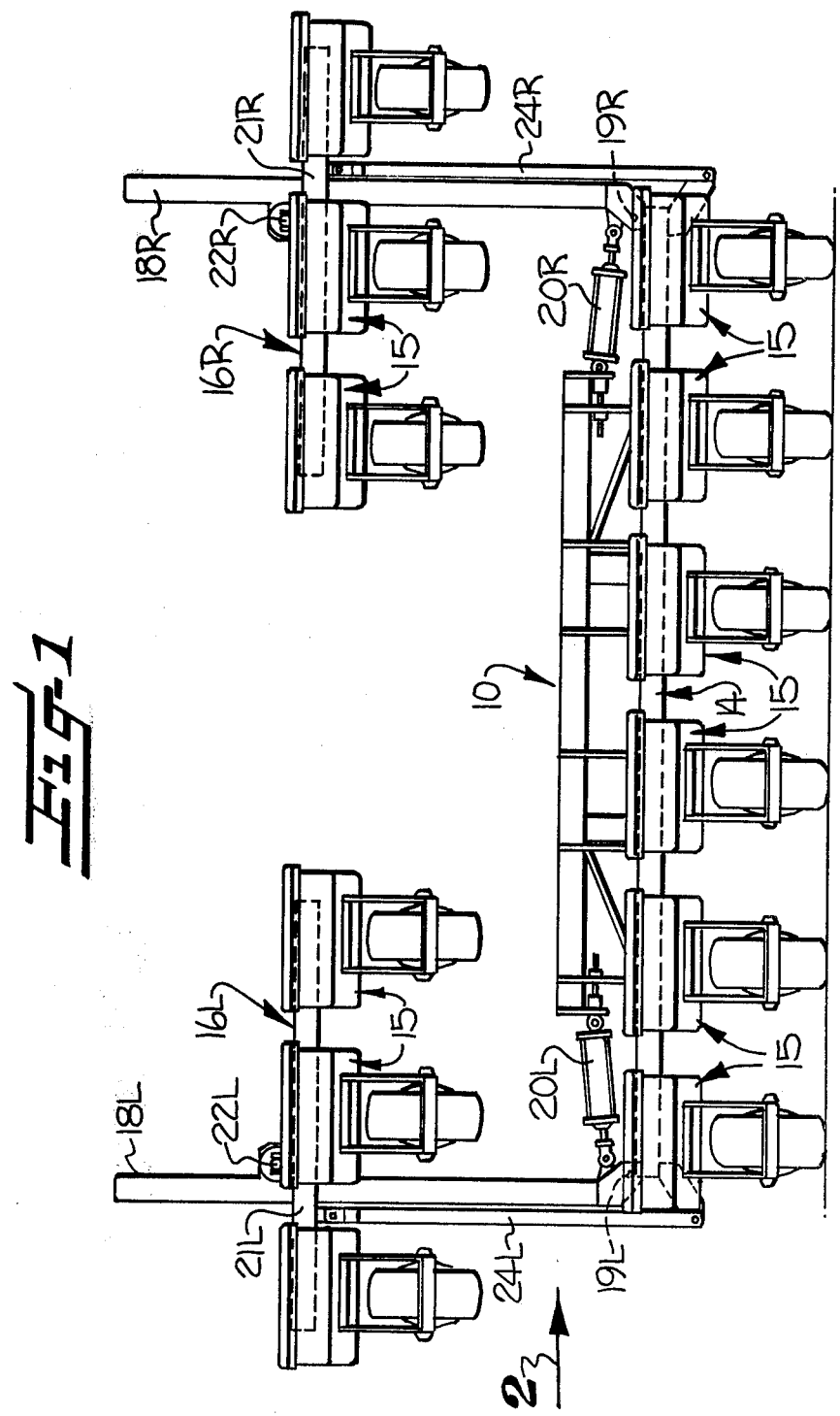
FIG. 1 is an elevation view, from the rear, of apparatus in accordance with the present invention.

The apparatus of the present invention includes secondary tool bar means for supporting at least one second implement to one side of the frame 10 and for alternately displacing the second implement to a position above the main tool bar 14 (as indicated in FIG. 1) so as to foreshorten the width of the apparatus for transport thereof from place to place without effecting any substantial change in the attitude of the second implement. In the form illustrated, the apparatus includes a left secondary tool bar means 16L and a right secondary tool bar means 16R. Each of the secondary tool bar means 16L, 16R mounts a corresponding plurality of planters 15 (FIG. 3).

Each secondary tool bar means comprises an elongate lever means 18L, 18R pivotally mounted on a side of the frame for pivotal movement on a substantially horizontal, forwardly and rearwardly extending axis. Each of the lever means 18L, 18R is adapted to be pivoted upwardly and downwardly between a substantially horizontal laterally extended position (FIGS. 3 and 8) and a substantially upright retracted position (FIGS. 1, 2 and 7). In the specific form shown, the inboard end of each lever is operatively connected with an outboard end of the main tool bar 14 for pivotal movement relative thereto about an axis defined by a pivot pin or axle. In the arrangements illustrated in FIGS. 7 and 8 for the left secondary tool bar 16L, the lever 18L is pivotally connected for movement about an axis defined by a pivot pin 19L. Pivotal movement of the lever 18L relative to the frame and main tool bar 14 is accomplished under the control of a hydraulic cylinder device 20L, connected between a portion of the frame and a pivot location on the lever 18L. As indicated in the drawings, a comparable arrangement is provided for the right secondary tool bar means 16R.

An outboard tool bar 21L, 21R is mounted on a corresponding lever 18L, 18R and is adapted to support planters 15 or other appropriate implements in a substantially horizontal position and laterally outwardly of the main tool bar 14 when the lever means are in the laterally extended position. Each outboard tool bar is operatively connected to the corresponding lever for pivotal motion about an axis defined by a stub shaft, by means of a pivotal joint generally indicated at 22L, 22R.

Linkage means are provided and are pivotally interconnected with the outboard tool bars 21L, 21R and the corresponding levers 18L, 18R so as to cooperate therewith for maintaining the outboard tool bars 21L, 21R substantially horizontal during movement of the lever means 18L, 18R relative to the frame 10. More particularly, and as illustrated in FIGS. 7 and 8 with respect to the left secondary tool bar means, a link 24L extends adjacent the lever 18L and is pivotally connected at one end with the outboard tool bar 21L and at the other with the main tool bar 14. The lever 18L, link 24L, outboard tool bar 21L, and main tool bar 14 together define a parallelogram four-bar linkage which maintains the main tool bar 14 and outboard tool bar 21L substantially parallel (and horizontal) during movement of the corresponding lever means 18L pivotally relative to the main tool bar 14. As will be appreciated, the link 24L imparts compensatory pivotal movement to the tool bar about its axis in a direction opposite from that of the lever as the lever is moved about its own pivotal axis. As will also be appreciated, such motion maintains the planters 15 on the outboard tool bars 21L, 21R in their normal attitude with respect to the vertical, thereby avoiding imposing on the frames of the planters laterally directed stresses and avoiding spilling from the hoppers of the planters materials disposed therein. Further, the action of the linkage means positively assures positioning of the implements in the desired attitude.

In the drawings and specification, there has been set forth a preferred embodiment of the invention, and although specific terms are employed, they are used in a generic and descriptive sense only and not for purposes of limitation.

That which is claimed is:

1. In apparatus for mounting agricultural implements and having a substantially horizontal frame adapted to be propelled over the ground by a tractor or the like, the combination therewith of an elongate, laterally extending, main tool bar carried by said frame and extending substantially horizontally for mounting at least one first implement thereon, and secondary tool bar means for supporting at least one second implement to one side of said frame and for alternatively displacing said second implement to a position above said main tool bar to foreshorten the width of the apparatus for transport thereof from place to place without effecting any substantial change in the attitude of said second implement, said secondary tool bar means comprising elongate lever means pivotally mounted on a side of said frame for pivotal movement in a vertical plane common with said main tool bar and on a substantially horizontal, forwardly and rearwardly extending axis and being adapted to be pivoted upwardly and downwardly between a substantially horizontal laterally extended position and substantially upright retracted position with respect to said frame, at least one outboard tool bar mounted on said lever means in longitudinally spaced relation from said plane and said main tool bar and adapted to support said second implement thereon in a substantially horizontal position and laterally outwardly of said main tool bar when said lever means occupies said laterally extended position, linkage means pivotally connected to said lever means and said outboard tool bar and cooperating therewith for maintaining said outboard tool bar substantially horizontal during movement of said lever means relative to said frame, and wheel means including an axle rigidly mounted on said lever means for engaging the ground upon said lever means occupying said extended position and thereby for floatingly supporting said outboard tool bar.

2. In an apparatus for mounting agricultural implements and having a substantially horizontal frame adapted to be propelled over the ground by a tractor or the like, the combination therewith of an elongate, laterally extending main tool bar carried by said frame and extending substantially horizontally for mounting at least one first implement thereon, and secondary tool bar means for supporting at least one second implement to one side of said frame and for alternatively displacing said second implement to a position above said main tool bar to foreshorten the width of the apparatus for transport thereof from place to place without effecting any substantial change in the attitude of said second implement, said secondary tool bar means comprising an elongate lever including an inboard end and an outboard end, means pivotally connecting said inboard end of said lever to an adjacent outer end of said main tool bar for pivotal movement on a substantially horizontal, forwardly and rearwardly extending axis, said lever being adapted to be pivoted about said axis upwardly and downwardly between a substantially horizontal laterally extended position aligned with said main tool bar and a substantially upright retracted position relative to said main tool bar, at least one elongate outboard tool bar pivotally mounted at a medial portion thereof on said lever and being positioned rearwardly of said lever, said outboard tool bar being adapted to support said second implement thereon in a substantially horizontal position laterally outwardly of said main tool bar when said lever occupies its said laterally extended position, and a link having one end portion pivotally connected to said main tool bar at a point beneath and adjacent to said outer end of said main tool bar and having its other end portion pivotally connected to said outboard tool bar at a point outwardly of that point at which said outboard tool bar is pivotally connected to said lever so as to maintain said outboard tool bar substantially horizontal during movement of said lever means relative to said main tool bar.

* * * * *